US009970551B2

(12) United States Patent
Berner et al.

(10) Patent No.: US 9,970,551 B2
(45) Date of Patent: May 15, 2018

(54) VALVE

(71) Applicant: FESTO AG & Co. KG, Esslingen (DE)

(72) Inventors: Michael Berner, Kirchheim (DE); Falk Rapke, Tubingen (DE)

(73) Assignee: FESTO AG & CO. KG, Esslingen (DE)

( * ) Notice: Subject to any disclaimer, the term of this patent is extended or adjusted under 35 U.S.C. 154(b) by 209 days.

(21) Appl. No.: 14/901,902

(22) PCT Filed: Jul. 5, 2013

(86) PCT No.: PCT/EP2013/001978
§ 371 (c)(1),
(2) Date: Dec. 29, 2015

(87) PCT Pub. No.: WO2015/000496
PCT Pub. Date: Jan. 8, 2015

(65) Prior Publication Data
US 2016/0153566 A1    Jun. 2, 2016

(51) Int. Cl.
*F15B 13/04*   (2006.01)
*F16K 1/44*    (2006.01)
*F16K 11/07*   (2006.01)
F16J 15/3252   (2016.01)

(52) U.S. Cl.
CPC ............ *F16K 1/44* (2013.01); *F16K 11/0712* (2013.01); *F16J 15/3252* (2013.01); *Y10T 137/86694* (2015.04)

(58) Field of Classification Search
CPC .. F16J 15/00; F16J 15/02; F16J 15/166; F16J 15/3216; F16J 15/322; F16J 15/3252; F16J 16/56; F16K 11/0712; Y10T 137/86694
USPC ........... 137/625.67; 251/324, 325, 361, 363; 285/379
See application file for complete search history.

(56) References Cited

U.S. PATENT DOCUMENTS

| | | | | |
|---|---|---|---|---|
| 2,861,592 A | * | 11/1958 | Collins | ................. F16K 31/426 137/625.64 |
| 2,888,281 A | * | 5/1959 | Ratti | ...................... F16J 15/164 277/366 |
| 3,004,528 A | * | 10/1961 | Logan, Jr. | ................ B61K 7/12 137/625.64 |
| 3,028,165 A | * | 4/1962 | Collins | .................... F16J 15/32 277/529 |

(Continued)

FOREIGN PATENT DOCUMENTS

DE    19603719           8/1997
DE    102006040052 B4 *  3/2016  ............. F16K 11/07
(Continued)

*Primary Examiner* — Craig J Price
(74) *Attorney, Agent, or Firm* — Hoffmann & Baron, LLP

(57) ABSTRACT

A valve, which has at least one seal ring arranged in a recess of a valve housing, which seal ring has a seal housing having a U-shaped cross-section, in which seal housing an annular sealing element is arranged. The seal housing has a multi-part design and contains at least one separate housing leg, which is fixed to an annular bottom section of the seal housing in a joining region. The sealing element has a static sealing section, which engages in a sealing groove formed in the bottom section and is suitable for interacting with the two groove flanks of the sealing groove in a sealing manner.

17 Claims, 5 Drawing Sheets

(56) References Cited

U.S. PATENT DOCUMENTS

| | | | | |
|---|---|---|---|---|
| 3,068,900 A * | 12/1962 | Logan, Jr. | B61K 7/12 | |
| | | | 137/596.16 | |
| 3,294,120 A * | 12/1966 | Ruchser | F15B 13/0405 | |
| | | | 137/596.16 | |
| 3,315,702 A * | 4/1967 | Passaggio | F15B 13/04 | |
| | | | 137/625.64 | |
| 3,329,159 A * | 7/1967 | Herion | F15B 13/0431 | |
| | | | 137/556 | |
| 3,418,002 A * | 12/1968 | Hennells | F16K 3/26 | |
| | | | 137/625.69 | |
| 3,451,430 A * | 6/1969 | Cowdin | F15B 13/0402 | |
| | | | 137/625.69 | |
| 3,565,115 A | 2/1971 | Beckett et al. | | |
| 3,985,337 A * | 10/1976 | Gripe | F16J 15/32 | |
| | | | 137/625.69 | |
| 4,432,391 A * | 2/1984 | Ott | F16K 31/426 | |
| | | | 137/625.6 | |
| 4,491,155 A * | 1/1985 | Meyer | F16K 11/0712 | |
| | | | 137/625.66 | |
| 4,515,184 A * | 5/1985 | Bownass | F16K 11/07 | |
| | | | 137/556 | |
| 4,630,800 A * | 12/1986 | Brausfeld | F16K 11/0712 | |
| | | | 137/625.69 | |
| 4,966,196 A * | 10/1990 | Meyer | F16K 31/426 | |
| | | | 137/269 | |
| 5,092,746 A * | 3/1992 | Henke | F04B 9/125 | |
| | | | 417/403 | |
| 5,171,025 A * | 12/1992 | Stoll | F16J 15/3252 | |
| | | | 137/248 | |
| 5,172,727 A * | 12/1992 | Stoll | F16J 15/3252 | |
| | | | 137/625.66 | |
| 5,190,078 A * | 3/1993 | Stoll | F16K 11/0712 | |
| | | | 137/625.69 | |
| 5,400,821 A * | 3/1995 | Ott | F15B 13/0402 | |
| | | | 137/614.2 | |
| 6,367,811 B1 * | 4/2002 | Hosokawa | F16J 15/3216 | |
| | | | 277/560 | |
| 9,625,042 B2 * | 4/2017 | Wilfong | F16K 11/0712 | |

FOREIGN PATENT DOCUMENTS

| | | |
|---|---|---|
| EP | 0472910 | 3/1992 |
| EP | 0475070 | 3/1992 |
| EP | 1847736 | 10/2007 |

* cited by examiner

VALVE

This application claims priority based on an International Application filed under the Patent Cooperation Treaty, PCT/EP2013/001978, filed Jul. 5, 2013

BACKGROUND OF THE INVENTION

The invention relates to a valve comprising a valve housing and a piston-type valve spool arranged in an axially displaceable manner in a recess of the valve housing for performing linear switching movements between various working positions, the recess having a central longitudinal axis, and further comprising at least one seal ring which coaxially encloses the valve spool in the recess and which has a multi-part annular seal housing located stationary relative to the valve housing and having a U-shaped cross-section with two opposite housing legs connected to each other by a radially outward annular base section, wherein at least one of the two housing legs is designed as a body which is separate from the base section and secured thereto in a joining region, the seal housing bounding a reception chamber which has, radially on the inside, a slot-like housing opening laterally flanked by the two housing legs and in which an annular sealing element designed on the one hand for acting together with the inner surface of the seal housing to form a static seal and on the other hand for acting together with the outer circumferential surface of the valve spool to form a dynamic seal is coaxially arranged, the sealing element having, for dynamic sealing, a dynamic sealing section located in the region of the slot-like housing opening and coaxially enclosing the valve spool with sealing contact in at least one of its working positions.

A valve of this type, which is known from EP 0 475 070 A1, is provided with a plurality of seal rings which are arranged coaxially and consecutively in a recess of a valve housing and which have a multi-part seal housing with a U-shaped cross-section, its U-opening defining a radially inward-oriented housing opening. Each seal housing bounds a reception chamber in which a sealing element made of an elastomer material is accommodated: this sealing element protrudes with a dynamic sealing section through the housing opening and is in dynamic sealing contact with the outer circumferential surface of a valve spool arranged displaceably in the recess of the valve housing. By executing linear switching movements, the valve spool can be moved between various working positions in which valve passages extending in the valve housing can be disconnected from or connected to one another in different patterns.

The multi-part structure of the seal housing makes the assembly of the sealing ring easier. In this context, the two housing legs of the seal housing are bodies which are separate from an annular base section of the seal housing and secured thereto by a snap connection or by press-fitting. In order to prevent a flow of the fluid to be sealed around the sealing element in the interior of the reception chamber, in particular if the joining region between the base section and a housing leg separate therefrom is not sealed hermetically, the sealing element has to be designed such that it is always pressed against the radially inward-oriented inner circumferential surface of the base section with a certain amount of preload. In this way, an all-round radial support of the sealing element is obtained, which is a target in the known valve in order to ensure that the sealing element provides with its dynamic sealing section a transverse support for the valve spool for its precise linear guidance. This, however, affects the ease of movement of the valve spool and thereby its switching speed, and the actuation of the valve requires relatively high driving forces combined with correspondingly high energy consumption.

A valve known from EP 0 472 910 A1 is subject to similar problems.

In the case of a valve disclosed in DE 196 03 719 A1, the seal ring has a one-piece seal housing, so that the topic of a seal between the housing legs and the base section is not relevant here. Producing a one-piece seal housing by material forming is, however, a relative complex and expensive process. In addition, the sealing element accommodated in the seal housing is radially supported by the seal housing, resulting once again in a high surface pressure between this sealing element and the valve spool.

From EP 1 847 736 B1, a seal arrangement is known which comprises a seal ring forming a seal between two machine elements, which is inserted into a mounting groove of the one machine element. Within this mounting groove, the seal ring provides a static seal. The seal section projecting from the mounting groove bears against the other machine element, which is movable relative thereto, to provide a dynamic seal.

SUMMARY OF THE INVENTION

The invention is based on the problem of modifying a valve of the above type in such a way that its at least one seal ring offers a reliable sealing action in combination with a simple structure.

In combination with the features listed above, this problem is solved by providing that a sealing groove, which is radially open towards the inside and designed as an annular groove and into which the sealing element dips with a radially outward static sealing section designed for acting together axially with the two groove sides of the sealing groove arranged opposite one another in the base section to provide a static seal, is formed in the interior of the reception chamber of the seal housing in the radially inward-oriented inner circumferential surface of the base section.

As a result, there is no need for a fluid-tight design of the joining region between the base section and each of the separate housing legs of the seal housing which are secured to the former. As the sealing element bears against the valve spool with its dynamic sealing section and against at least one of the sides of the sealing groove with its static sealing section, the sealing element forms a fluid-tight block between the two housing legs, in particular separating the joining region located on the one side of the sealing element from the other side of the sealing element in a fluid-tight manner. Even if a fluid present in the recess of the valve housing manages to enter the reception chamber of the seal housing through a joining region which has not been sealed, it cannot flow across to the axially opposite side of the sealing element. This ensures the full functionality of the sealing element in combination with a cost-effective design of the joining region. In particular, there is no need for time-consuming and costly tightness checks for the at least one joining region.

As the static sealing section acts together with the groove sides of the sealing groove, the groove bottom of this sealing groove does not have to be sealed. It is therefore possible to leave a free space between the sealing element and the groove bottom of the sealing groove, which gives the sealing element a certain amount of radial movement without any radial compression. As a result, the radial preload of the sealing element relative to the valve spool can be reduced to a minimum level which ensures the desired sealing action, which facilitates easy switching movements of the valve spool.

Advantageous further developments of the invention can be derived from the dependent claims.

Each housing leg is expediently designed as a body which is separate from the base section and secured to the base section in its own joining region, The sealing groove lies between the two joining regions and therefore seals in both directions.

It is advantageous if the seal ring has, on each of the axially opposite side surfaces of its static sealing section, a raised sealing region which can bear against the associated groove side of the sealing groove with a high surface pressure. Such a sealing region is, for example, implemented in the form of a sealing bead which is concentric with the longitudinal axis of the sealing element or a sealing edge which is likewise concentric with the longitudinal axis of the sealing element. The sealing edge results, for example, from a side surface of the static sealing section which is inclined relative to a radial plane.

For location on the base section, each annular housing leg designed as a separate body is expediently installed into a joining groove formed on the axial outer surface of the annular base section, being in particular located therein by the plastic deformation of the retaining sections of the base section. These retaining sections can in particular be provided by a local caulking of the base section.

It is considered to be particularly advantageous if the static sealing section has a smaller width than the sealing groove, the seal ring being axially movable in the seal housing, so that in operation it is axially pressed by the axially applied fluid pressure against the groove side of the sealing groove located on the other side while forming a seal. In this way, the sealing element can be capable of free movement in the seal housing within certain limits, so that it can optimally adapt to the transverse position of the valve spool relative to the valve housing, while the static sealing action between the sealing element and the two groove sides of the sealing groove is nevertheless ensured.

The sealing element is expediently provided with at least one axially protruding securing projection which engages with an axial securing recess formed on the inner surface of the seal housing. Such a securing projection secures the sealing element against radial extraction from the reception chamber of the seal housing, in particular in combination with a suction caused by pressure differentials.

It is advantageous if the sealing element has such a securing projection on each of its axially opposite side surfaces, the seal housing having on each of the inner surfaces of its two housing legs an axial securing recess into which the associated securing projection dips. Each securing projection and each securing recess are preferably designed to be annular.

Separate securing projections and securing recesses are unnecessary if the at least one securing projection is directly represented by the existing static sealing section, at least a section of each securing recess being represented by the sealing groove.

Alternatively, the at least one securing projection can be independent of the static sealing section, being located at a radial distance therefrom and closer to the housing opening of the reception chamber of the seal housing. This version offers the advantage that the static sealing section and the securing projection can be designed independently of one another and optimally for their respective applications.

Expediently, several seal rings enclosing the valve spool at a mutual distance are arranged in the recess of the valve housing.

The seal rings are preferably secured to the valve housing independently of one another. Each seal ring is preferably secured by being pressed with its seal housing into the recess of the valve housing while forming a seal and by being secured therein with press fit.

As mentioned above, it is advantageous if at least the annular sealing section and preferably the whole sealing element is/are capable of floating movement relative to the seal housing at right angles relative to the longitudinal axis of the seal ring. In this way, the sealing element can always encompass the valve spool reliably with all-round sealing contact irrespective of any minimal transverse movements of the latter.

In an advantageous further development of the valve, at least one of the housing legs of the seal housing is designed as a guide leg having at least one radially inward-oriented guide surface which, by direct contact with the outer circumferential surface of the valve spool, provides a transverse support and a linear guidance of the valve spool which are independent of the associated sealing element. In order to avoid side tilt as far as possible, it is expedient if only one of the two housing legs of the seal housing is designed as a guide leg.

The guide surface is preferably composed of a plurality of guide surface sections distributed at a distance from one another around the valve spool. In this way, the size of the contact area between the guide surface and the outer circumferential surface of the valve spool is reduced to a minimum.

BRIEF DESCRIPTION OF THE DRAWINGS

The invention is explained in greater detail below with reference to the accompanying drawing, of which.

DETAILED DESCRIPTION OF THE PREFERRED EMBODIMENTS

Figure 1:
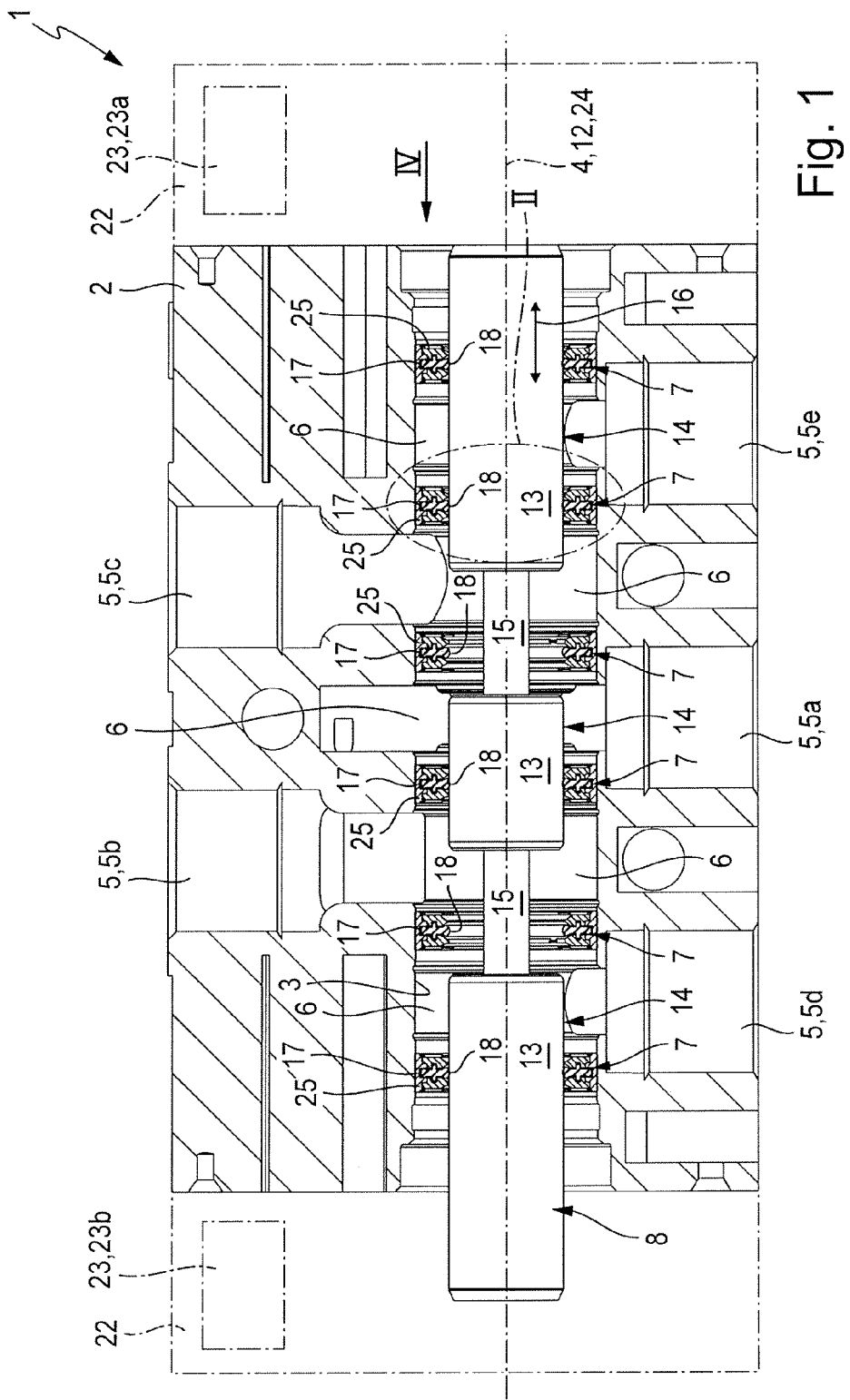
FIG. 1 is a longitudinal section through a preferred embodiment of the valve according to the invention, with terminating bodies at the end faces and drive means for the actuation of the valve being indicated by dot-dash lines.

Unless stated otherwise, the following explanations apply to all embodiments.

The valve identified as a whole by the reference number 1 is preferably constructed as a multiway valve and comprises a valve housing 2, in which a recess 3 having a linear orientation and preferably a cylindrical contour is formed. The recess 3 has an imaginary central longitudinal axis 4, which is indicated by dot-dash lines.

Peripherally into the recess 3, several valve passages 5 passing through the valve housing 2 terminate. Between the recess sections 6 of the recess 3, each of which communicates with one of the valve passages 5, a seal ring 7 of a special structure is placed; this structure will be explained in greater detail below. In any case, several seal rings 7 are preferably placed in the recess 3 with mutual axial spacing.

Each of the two axially outward recess sections 6 is preferably also flanked by a seal ring 7 on its axial outside.

In the recess 3, a valve spool 8 of a piston-type design extends coaxially through the plurality of seal rings 7. Its longitudinal axis 12 coincides with the longitudinal axis 4 of the recess 3.

The valve spool 8 has at least one control section 13 and preferably several control sections 13 arranged at an axial distance from one another, each of which defines a radially oriented outer circumferential surface 14 of the valve spool 8. Between each of the axially adjacent control sections 13, a web section 15 having a smaller cross-section than the control sections 13 extends. By the controlled application of driving forces, the valve spool 8 can be induced to perform a linear switching movement 16 indicated by a double-headed arrow in one or the other axial direction, in order to move it to different working positions relative to the valve housing 2 and the seal rings 7, in which working positions the valve passages 5 are connected to or disconnected from one another in a fluid-tight manner in different patterns.

The result is a fluid connection between two valve passages 5 whenever a web section 15 of the valve spool 8 passes through that seal ring 7 which is located between the recess sections 6 connected to the respective valve passages 5. As the web section 15 has a smaller cross-section than the inner cross-section bounded by the seal ring 7, there is an annular overflow gap available to a fluid for flowing between the valve passages 5.

The connection between two adjacent valve passages 5 is blocked in a fluid-tight manner if, by suitable positioning of the valve spool 8, one of the control sections 13 adopts a position in which it extends through the respective seal ring 7. In this case, the seal ring 7 concentrically bears with an annular sealing element 17 against the outer circumferential surface 14 of the respective control section 17 with all-round sealing contact.

In a switching process, the valve spool 8 slides with its at least one control section 13 along at least one annular sealing element 17, until it has reached the desired working position. As the valve spool 8 can move axially relative to the sealing element 17 which seals it, the section of the annular sealing element 17 which is in sealing contact with the outer circumferential surface 14 can be described as a dynamic sealing section 18.

The valve housing 2 can be provided with a preferably releasable terminating body 22 at one or both of its end faces. Each terminating body 22 bounds the recess 3 at one of its two end faces. The recess 3 can easily extend into the two terminating bodies 22.

The valve 1 is expediently provided with drive means 23 for the controlled application of driving forces to the valve spool 8 for initiating the switching movement 16. These drive means 23 are preferably represented by at least one electrically actuated pilot valve device 23a, 23b, which in particular comprises a solenoid valve or another electrically actuated valve. By means of electric actuation, fluid pressure can be applied to the valve spool 8 in the one and/or the other axial direction for its axial displacement in the recess 3. The drive fluid would be compressed air in particular.

However, the valve 1 may, for example, be designed for direct electric actuation, with drive means 23 of electromechanical, electromagnetic and/or electrodynamic design, so that they apply a driving force based on the respective principle to the valve spool 8.

The valve 1 of the illustrated embodiment is conceived as a 5/2-way valve, having five valve passages 5, which are interconnected in different ways by two different working positions of the valve spool 8. One valve passage 5 is a feed passage 5a, which can be connected to an external pressure source, while two further valve passages 5 are designed as working passages 5b, 5c, which can be connected to a load, and two further valve passages 5 act as relief passages 5d, 5e connected to a pressure sink and in particular to the atmosphere. In each of the two switching positions, the feed passage 5a is connected to a working passage 5b or 5c, which is at the same time disconnected from the relief passages, while the other working passage 5c or 5b is connected to one of the relief passages 5d or 5e while being disconnected from the feed passage 5a.

The design according to the invention can, however, also be used in valves of a different functionality, such as 2/2-way valves or 3/2-way valves. The principle of the invention is further suitable both for on-off valves and for proportional valves.

The number of the seal rings 7 installed into the valve 1 depends on the valve type in particular. A 2/2-way valve, for example, could be equipped with only one seal ring 7.

Figure 2:
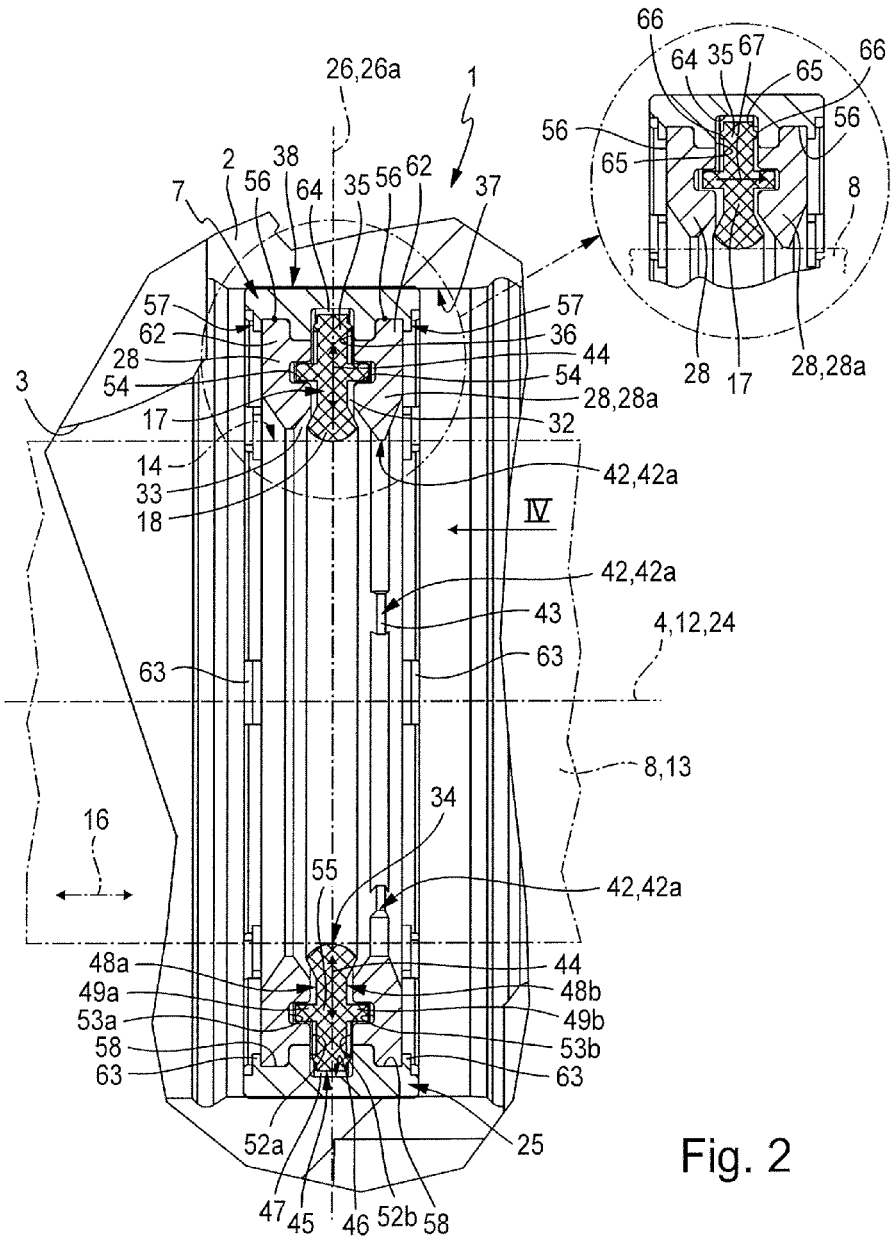
FIG. 2 is an enlarged representation of the region framed by dot-dash lines in FIG. 1, which lies in the region of a seal ring, a section of the seal ring being illustrated separately and the cutting plane of the seal ring extending in accordance with III-III from FIG. 4.
Figure 3:
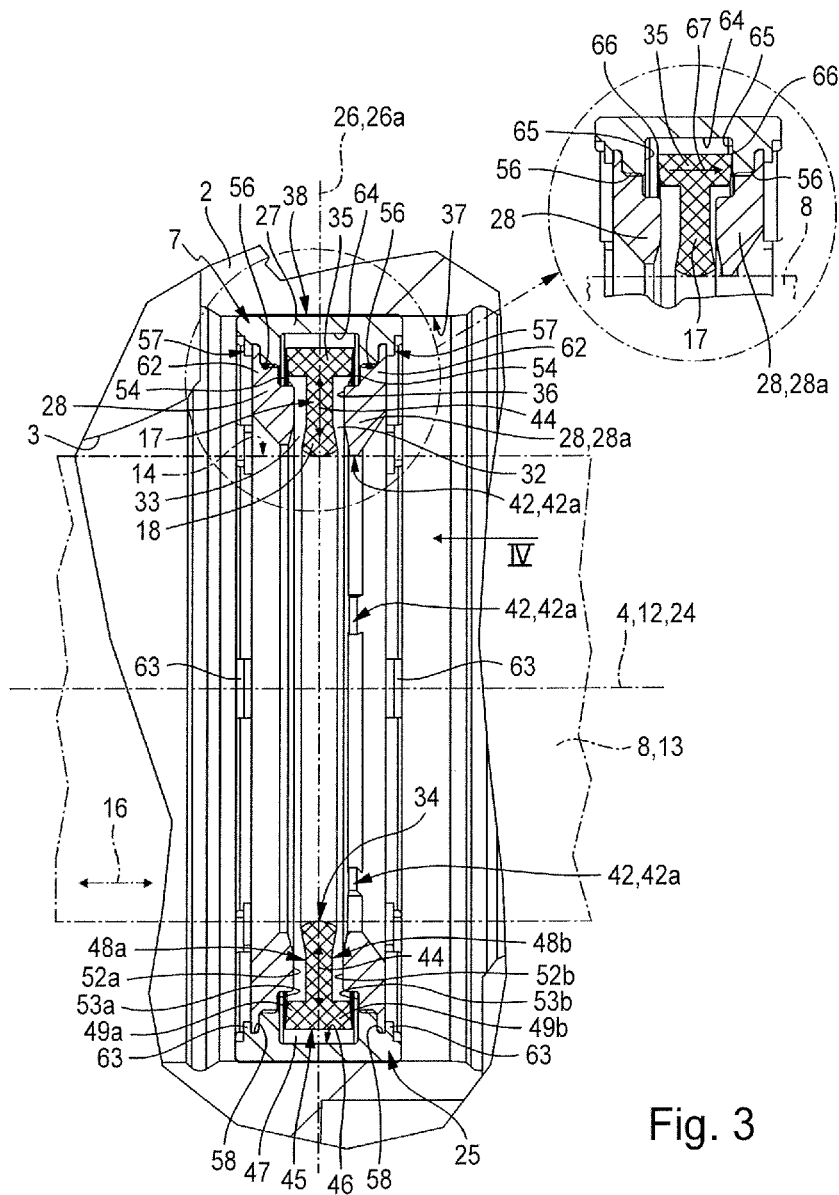
FIG. 3 shows a section of a valve in a representation corresponding to FIG. 2, with an alternative design of a seal ring.
Figure 4:
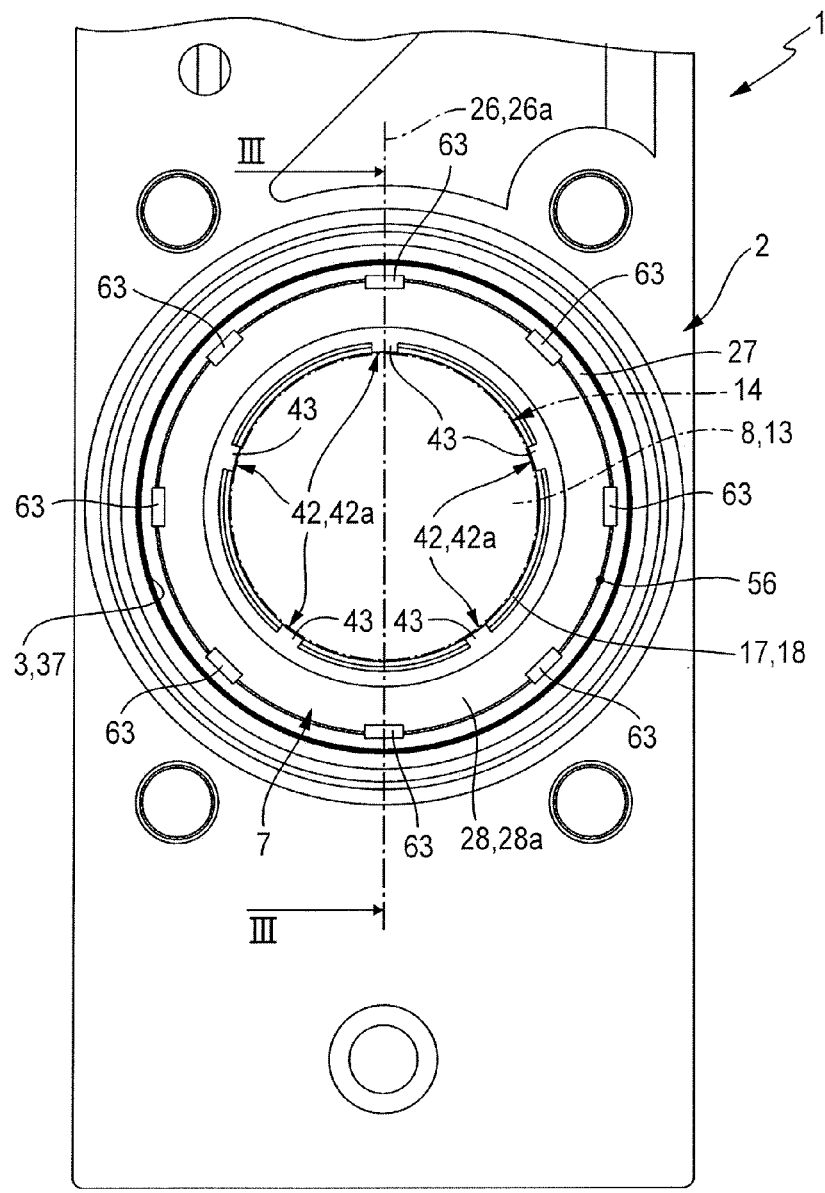
FIG. 4 is an end view of the valve, with an axial view on one of the seal rings in a direction according to arrow IV from FIGS. 1 and 2, the valve spool being indicated by dot-dash lines as in FIGS. 2 and 3.
Figure 5:
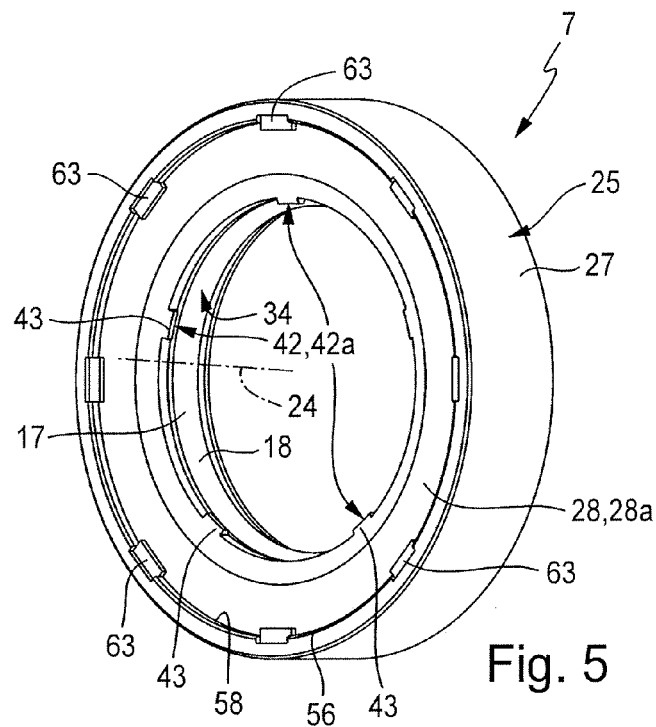
FIG. 5 is a perspective individual representation of a seal ring.
Figure 6:
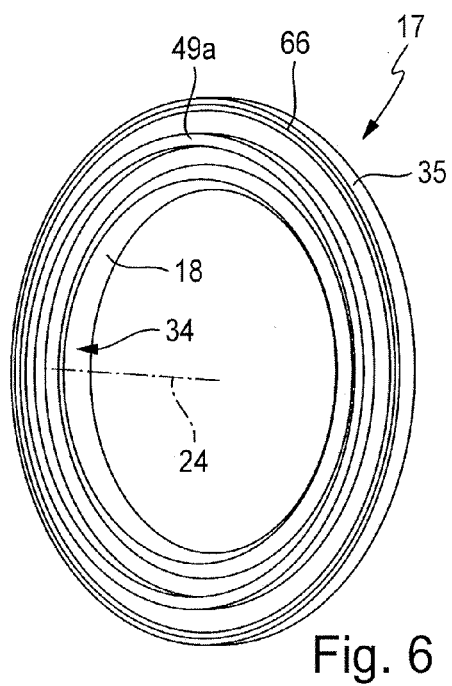
FIG. 6 is a perspective individual representation of the annular sealing element provided in the seal ring according to FIG. 2.
Figure 7:
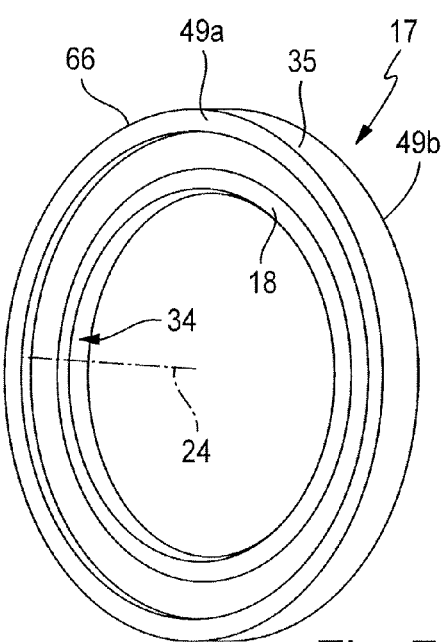
FIG. 7 is a perspective individual representation of the annular sealing element provided in the seal ring according to FIG. 3.

The seal rings 7 of the valve 1 are identical to one another, so that the detailed description can be applied to any one of the seal rings 7. In the illustrated embodiment, the valve 1 is equipped with seal rings 7 as shown in FIG. 2, but it can be equipped with seal rings 7 as shown in FIG. 3 as an alternative. A mixture of the two types of seal rings 7 can also be used in principle.

The seal ring 7 has a longitudinal axis 24, which coincides with the longitudinal axis 4 of the recess 3 when it is installed into the recess 3.

The seal ring 7 comprises a seal housing 25, which is coaxial with the longitudinal axis 24 and preferably has a rigid structure and an at least substantially U-shaped cross-section. This cross-section is present in a cutting plane defined by the longitudinal axis 24 and a radial axis 26 perpendicular to the former. This cross-section can be seen in FIGS. 1 to 3. The seal housing 25 can, for example, be made of a plastic material or of metal or of a composite material.

The seal ring 7 is arranged such that the U-opening of its cross-section is oriented radially inwards and faces the longitudinal axis 24. Accordingly, the seal housing 25 has an annular base section 27 located radially outside the U-opening and two housing legs 28, which are located opposite one another at a distance in the axial direction of the seal ring 7, and each of which extends around the longitudinal axis 24 while projecting radially inwards from the base section 27. Together, the two housing legs 28 and the base section 27, which connects the two housing legs 28 in the radially outward region, bound an annular space identified as reception chamber 32, which is open radially inwards towards the longitudinal axis 24 with a slot-shaped housing opening 33 defined by the U-opening. The housing opening 33 extends in a ring shape around the longitudinal axis 24.

Each of the two housing legs 28 expediently has the shape of a perforated plate. The annular base section 27 expediently has a sleeve-like structure.

The annular sealing element 17 mentioned above is located in the reception chamber 32 coaxially with the seal housing 25. It is expediently made of a material with rubber-elastic properties, in particular of an elastomer material. This being so, it is elastically and reversibly deformable.

The radially inward annular section of the sealing element 17 forms the dynamic sealing section 18 referred to above. It has a radially inward-oriented sealing surface which shall be referred to as dynamic sealing surface 34 and which bears against the outer circumferential surface 14 of that control section 13 of the valve spool 8 which is currently enclosed by the seal ring 7 in the circumferential direction of the longitudinal axis 12 with all-round sealing contact. If the valve spool 8 performs a switching movement, the outer circumferential surface 14 slides along the dynamic sealing surface 34 until a web section 15 enters the region within the seal ring 7, thereby cancelling any sealing contact between the dynamic sealing section 18 and the valve spool 8.

The annular sealing element 17 has a further sealing section which shall be referred to as static sealing section 35, because it provides a static seal against the seal housing 25 within the reception chamber 32. To provide this static seal, it bears against that inner surface 36 of the seal housing 25 which bounds the reception chamber 32 with a sealing action.

If a control section 13 extends through the seal ring 7, a blocking state is present in which the regions of the recess 3 located on opposite sides of the seal ring 7 are disconnected from one another in a fluid-tight manner. This results from the sealing contact between the dynamic sealing section 18 and the valve spool 8 and from the simultaneous sealing contact between the static sealing section 35 and the seal housing 25. The annular sealing element 17 itself it impermeable to fluids. In addition, the seal housing 25 is secured to the valve housing 2 in a sealed arrangement, so that fluid cannot pass between the seal housing 25 and the valve housing 2. This sealed assembly is preferably obtained by pressing the seal housing 25 into the recess 3, so that pressure is applied radially from the outside by the inner circumferential surface 37 of the recess 3, providing a non-positive hold. This pressure is strong enough for a static sealing contact which prevents a passage of fluid.

If required, additional sealing means can obviously provided between the seal housing 25 and the valve housing 2, or another sealing principle can be implemented as a whole.

A reliable press fit with good sealing action is in particular achieved by providing that the annular base section 27 has a cylindrical outer circumferential surface 38 which, prior to the installation into the recess 3, has a slightly larger cross-section than the recess 3, resulting in a firm press fit when it is pressed into the recess 3, whereby the seal ring 7 is secured in the desired position exclusively by this press fit without any additional retaining means.

One of the two housing legs 28, each of which is annular in shape, is conceived as a guide element providing a transverse support for the valve spool 8 enclosed by it in the radial direction thereof, so that the valve spool 8 is guided for linear movement in the axial direction of its longitudinal axis 12 to perform the switching movements 16. In view of its guiding characteristics, the respective housing leg 28 shall be described as guide leg 28a. The transverse support happens whenever the valve spool 8 extends through the guide leg 28a with the outer circumferential surface 14 of a control section 13.

All seal rings 7 of the valve 1 are expediently designed identical to one another, so that each sealing ring 7 contributes to the transverse support and the linear guidance of the valve spool 8 relative to the valve housing 2. However, it is possible to provide only some of the sealing rings 7 with a guide leg 28a. The arrangement should be configured such that the outer circumferential surface 14 of the valve spool 8 is encompassed by the guide legs 28a of at least two seal rings 7 in each of its axial positions. This ensures a precise alignment of the valve spool 8 relative to the valve housing 2.

The function a guide leg 28a results from the fact that the housing leg 28, 28a in question has at least one and preferably precisely one guide surface 42, which faces radially inwards and extends all around the longitudinal axis 24 of the seal ring 7 and therefore in the circumferential direction all around the valve spool 8 as well. This guide surface 42 is designed such that it can provide the above-mentioned transverse support for the valve spool 8 by direct contact with the outer circumferential surface 14 of the valve spool 8, in particular independently of the associated sealing element 17.

The valve spool 8 is expediently guided relative to the valve housing 2 exclusively by the guide legs 28a of the seal rings 7. There is no need for further guidance means, which are therefore preferably not provided.

The guide surface 42 can be an annular surface which extends continuously around the valve spool 8. It is, however, considered to be more advantageous to use the variant implemented in the illustrated embodiment, in which the guide surface 42 is composed of a plurality of guide surface sections 42a distributed around the valve spool 8 with mutual spacing. Each of these guide surface sections 42a radially facing the valve spool 8 is preferably curved in a circular arc, the radius of curvature preferably being slightly larger than that of the outer circumferential surface 14 of the valve spool 8. Any contact between the guide surface sections 42a and the valve spool 8 is a line contact in particular.

The guide surface sections 42a are expediently represented by guide projections 43, which project radially inwards from edge surfaces facing radially inwards towards the longitudinal axis 14 of the seal ring 7 and which are an integral part of the guide leg 28a and expediently tab-shaped. In the circumferential direction of the guide leg 28a, which is the direction around the longitudinal axis 24, there is between consecutive guide projections 43 in each case a region of the guide leg 29a which is radially offset towards the outside and which can never come into contact with the valve spool 8.

The guide surface sections 42a are expediently distributed evenly around the valve spool 8. Their circumferential dimension in the circumferential direction of the guide leg 28a is expediently smaller than the radially offset regions in between.

The guide surface 42 or the sum of the guide surface sections 42a frames a cross-section through which the valve spool 8 extends and which is matched to the cross-section of the outer circumferential surface 14 of the valve spool 8 in such a way that the latter can easily slide through the guide leg 28a while being radially supported in its position for transverse stability. This is expediently achieved by providing that the cross-sections are matched to one another in the manner of a clearance fit, so that, in an ideally concentric alignment between the valve spool 8 and the guide surface 42, there is a minimal running gap, preferably in the range of a maximum of tenths of a millimeter. This arrangement reliably prevents a jamming of the valve spool 8 in the guide leg 42a.

It is expedient if only one of the two housing legs 28 is designed as a guide leg 28a, while the other housing leg 28 frames a cross-section which is larger than the guide cross-section framed by the guide surface 42, so that this other housing leg 28 never comes into direct contact with the valve spool 8. This avoids static overdetermination, which could otherwise occur, because the two housing legs 28 are axially very close to each other. However, if manufacturing accuracy is adequate, it is possible to design both housing legs 28 as guide legs 28a in the above sense.

In the context of the described guidance function of at least one housing leg 28, in particular, it is advantageous if the annular sealing element 17 is, within the reception chamber 32, capable of floating movement relative to the associated seal housing 25 in a radial plane 26a perpendicular to the longitudinal axis 24 of the seal ring 7. This radial floating capability, which is illustrated in the drawing by a double-headed arrow at 44, preferably applies to the whole sealing element 17 and at least to the dynamic sealing section 18, which comes into direct contact with the outer circumferential surface 14 of the valve spool 8 in the operation of the valve 1.

With this floating, i.e. radially movable, arrangement of the sealing element 17, it is achieved among other factors that the surface pressure between the dynamic seal surface 34 and the valve spool 8 is not increased if the valve spool 8 changes its radial position relative to the seal housing 25 as a result of the minimal running clearance which may exist between the outer circumferential surface 14 and the guide surface 42. As a result, the ease of movement of the valve spool 8 is not affected by any tolerance-related minimal positional changes which may occur in the radial plane 26a.

This effect can be obtained even without a floating mounting of the sealing element 17 if the latter is structured such that it has an adequate internal elastic deformability which can compensate for any transverse movements of the valve spool 8 without increasing the contact force against the outer circumferential surface 14 to a relevant degree.

The seal housing 25 and the annular sealing element 17 are expediently matched in their radial dimensions in such a way that a free annular gap 47, i.e. an air gap, is formed within the reception chamber 32 between the radially outward-oriented outer circumferential surface 45 of the sealing element 17 and the radially inward-oriented inner circumferential surface 46 of the seal housing 25. This free annular gap 47 extends concentrically radially between the sealing element 17 and the seal housing 25. The inner circumferential surface 46 expediently is a section of the inner surface 36 formed radially on the inside of the base section 27. The outer circumferential surface 45 expediently is the outer circumferential surface of the sealing element 17 of the radially outward static sealing section 35.

The height of the free annular gap 47 as measured radially relative to the longitudinal axis 24 is in particular dimensioned such that the above-mentioned radial floating of the sealing element 17 is ensured.

The dimensions of the sealing element 17 as measured radially relative to the longitudinal axis 14 are expediently smaller than the radially measured depth of the reception chamber 32 from the inner circumferential surface 46 to the guide surface 42.

At each of its two axially opposite side surfaces 48a, 48b, the sealing element 17 preferably has an axially protruding securing projection 49a, 49b. Each of these securing projections 49a, 49b is expediently annular and coaxial with the longitudinal axis 24.

In the interior of the reception chamber 32, the seal housing 25 further comprises on each of the two axially facing lateral inner surface sections 52a, 52b an axial securing recess 53a, 53b assigned to the securing projection 49a, 49b located on the same side. These two securing recesses 53a, 53b are likewise annular and coaxial with the longitudinal axis 24.

In this way, the securing projections 49a, 49b and the securing recesses 53a, 53b are arranged in pairs, each securing projection 49a, 49b axially dipping into the associated securing recess 53a, 53b.

In this way, each securing projection 49a, 49b engages from behind in the axial direction a radially outward-oriented securing surface 54 represented by a flank of the associated axial securing recess 53a, 53b.

In an embodiment not shown in the drawing a securing projection and an associated securing recess are provided on only one axial side of the sealing element 17. Also possible is an embodiment in which the mutually engaging securing projections and securing recesses extend only around a part of the longitudinal axis 24.

The cooperating securing projections 49a, 49b and securing recesses 53a, 53b define a securing device which prevents an unintentional radial extraction of the sealing element 17 from the reception chamber 32. Such an extraction could otherwise by caused by a suction generated at the dynamic sealing section 18 in the opening or closing process.

This measure results in a quasi-positive location of the sealing element 17 in the seal housing 25. The radial dimensions of the mutually engaging securing components, i.e. of the securing projection 49a, 49b and securing recess 53a, 53b, are indeed matched in such a way that there is a radial play which does not affect the floating movement according to arrow 44.

The securing projection 49a, 49b can be located in different regions of the sealing element 17. The embodiment of FIG. 2 illustrates a variant in which the securing projection 49a, 49b are arranged at a radial distance from the static sealing sections 35 closer to the longitudinal axis 24. They are in particular located in a transition section 55 of the sealing element 17 which integrates the static sealing section 35 with the dynamic sealing section 18.

In an alternative embodiment, which is illustrated in FIG. 3 by way of example, the securing projection 49a, 49b are directly represented by the static sealing section 35 or are a part thereof. In this case, the axial securing projections 49a, 49b are expediently located radially outside on the sealing element 17 in such a way that they contribute to the formation of the outer circumferential surface 45.

The implementation of the at least one securing projection 49a, 49b as a part of the static sealing section 35 offers the advantage of a particularly simple production of the sealing element 17.

The seal housing 25 preferably has a multi-part structure which simplifies the installation of the sealing element 17. Both housing legs 28 are expediently designed as bodies or components which are separate from the base section 27 and secured thereto by suitable means. The seal housing 25 preferably comprises three separate bodies in the form of the two housing legs 28 and the annular base section 27, which are secured to one another.

Each housing leg 28 is expediently secured to the base section 27 in its own joint region 56 independently of the other housing leg 28. This results in the rigid seal housing 25 with its U-shaped cross-sectional contour.

Both the two housing legs 27 and the base section 27 expediently contribute to the formation of the inner surface 36 of the reception chamber 32.

On each of its two axial outer surfaces 57, the annular base section 27 is preferably provided with a concentrically arranged annular joining groove 58, with which the associated axially fitted annular housing leg 28 engages with its radially outward edge region 62 and in which it is located by means of this radially outward edge region 62. This location of the housing legs 28 is preferably based on local plastic deformation of that region of the base section 27 which bounds the joining groove 58, resulting in radially inward-projecting plastically deformed retaining sections 63, which radially encompass the associated housing leg 28 on the axial outside and clamp it to the base section 27 in the axial direction. This is an effective and easily accomplished securing measure.

The housing legs 28 can be secured to the base section 27 in other ways as well. Each housing leg 28 could, for example, be snap-fitted or latched into the joining groove 58. A welded joint or adhesive bonding would also be possible. This list should not be considered as a final solution.

The static sealing section 35 can expediently cooperate with the inner surface 36 of the seal housing 25 to form a seal in such a way that fluid cannot flow between the two axial sides of the sealing element 17 during the operation of the valve 1 in the blocking state referred to above, even if one and/or another of the joining regions 56 is/are permeable to fluid. This offers the advantage that there is no need for paying special attention to a fluid-tight connection when securing the housing legs 27 to the base section 27, which reduces manufacturing costs. In the illustrated embodiments, the joining region is indeed not fluid-tight.

The special static sealing action preferably results from a sealing groove 64, which is designed as an annular groove with a radially inward-oriented opening and which is formed in the interior of the reception chamber 32 in the radially inward-oriented inner circumferential surface 46 of the annular base section 27 and into which the sealing element 17 dips with its radially outward static sealing section 35. The static sealing section 35 is designed such that it can, while forming a seal, bear against the two sides 65 of the sealing groove 64, which face one another and are arranged opposite one another with axial spacing. As each joining region 56 between the base section 27 and a housing leg 28 is outside the sealing groove 64, the static sealing contact between the static sealing section 35 and at least one groove side 65 provides an effective fluid-tight block which prevents the passage of fluid between the two axial sides of the sealing element 17.

The annular base section 27 is expediently constructed in one piece at least in the region defining the sealing groove 64 and preferably in its totality.

The sealing groove 64 defines the radially outward edge region of the reception chamber 32.

The static sealing action described above is advantageous even if only one of the housing legs 28 is a separate body from the annular base section 27, while the other housing leg 28 is integrated with the annular base section 27. Even in a completely integrated structure of the seal housing 25, the static sealing action described above advantageously prevents a flow around the sealing element 17 in the interior of the reception chamber 32.

An optimum static seal based on especially strong surface pressure can be obtained if at least one raised sealing region 66, which can be pressed against the associated groove side 66, is formed on each of the axially opposite side surfaces of the static sealing section 35. This raised sealing region 66 extends continuously and concentrically around the longitudinal axis of the sealing element 17.

The raised sealing region 66 can, for example, be bead-shaped as in the embodiment shown in FIG. 2 and form a sealing bead which axially projects relative to radially adjacent surface sections of the static sealing section 35. Such a sealing bead expediently has a rounded contour.

Another preferred variant of the raised sealing region 66 is shown in FIG. 3. Here, the raised sealing region 66 has the shape of a sealing edge which is formed in the transition region between the radial outer circumferential surface 45 and each axial side surface of the static sealing section 35 by providing that the axial side surfaces of the static sealing section 35 are inclined relative to the radial plane 26a and diverge radially outwards.

The static sealing section 35 can be designed such that that it always bears against both groove sides 65 of the sealing groove 64 simultaneously while forming a seal. Particularly advantageous, however, is an embodiment in which the static sealing section 35 has a smaller width than the sealing groove 64 and the annular sealing element 17 is accommodated in the seal housing 25 with axial play, therefore being axially movable, so that the static sealing section 35 can alternatively bear against one or the other of the two groove sides 65 of the sealing groove 64 while forming a seal.

Against which of the two groove sides 65 the static sealing section 35 is pressed depends on the fluid pressure conditions axially applied to the sealing element 17. Depending on the pressure differential which acts axially on the sealing element 17, the sealing element 17 is displaced in either the one or the other axial direction within the reception chamber 32 and pressed against the respective groove side 65, being lifted off the other groove side 65.

In the framed sections of the seal ring 7 shown in FIGS. 2 and 3, an operating state is illustrated in which the sealing element 17, owing to a pressure differential acting towards the right, is displaced relative to the seal housing 25 in accordance with arrow 67 and pressed against the groove side 65 oriented against the direction of displacement while forming a static seal.

Owing to the design described above, the sealing element 17 is expediently located in the reception chamber 32 in an arrangement capable of floating axially or of limited movement, which enables it to move together with the valve spool 8 at the start of a switching movement 16 and to come into contact with and be stopped at the groove side 65 placed in front in the direction of movement only when the valve spool 8 already has a certain amount of kinetic energy, so that the release of the slightly adhering contact between the dynamic sealing surface 34 and the outer circumferential surface 14 of the valve spool 8 is facilitated.

If the seal ring 7 is provided with at least one of the axial securing recesses 53a, 53b referred to above, it is advantageous if the static sealing section 35 is shaped such that it simultaneously forms the securing projections 49a, 49b. This applies to the embodiment of FIG. 3. At least one section of the respective securing recess is in this case expediently represented by the sealing groove 64.

According to FIG. 3, each of the two axial securing recesses 53a, 53b consists of two sections, of which one is formed in the base section 27 and the other in the associated housing leg 28. The section of the securing recess 53*a*, 53*b* which is formed in the base section 27 simultaneously is a section of the sealing groove 64. Each radial securing surface 64 is here formed on one of the housing legs 28.

The radial depth of the sealing groove 64 is in particular chosen such that the static sealing section 35 can bear against the groove sides 65 with sealing contact irrespective of the radial position currently adopted by the sealing element 17 relative to the seal housing 25. As a result of the preferred radially floating arrangement of the sealing element, the static sealing section 35 is even capable of sliding along the groove side 65 against which it currently bears while maintaining its sealing contact, if the coaxial alignment between the sealing element 17 and the seal housing 25 should change to a minimal degree during a switching movement 16 of the valve spool 8.

The invention claimed is:

1. A valve comprising a valve housing and a piston valve spool arranged in a recess of the valve housing in an axially displaceable manner for performing linear switching movements between various working positions, the recess having a central longitudinal axis, and further comprising at least one seal ring which coaxially encloses the valve spool in the recess and which has a multi-part annular seal housing located stationary relative to the valve housing and having a U-shaped cross-section with two opposite housing legs connected to each other by a radially outward annular base section, wherein each of the two housing legs is designed as a body which is separate from the base section and secured to the base section in a respective joining region, the seal housing bounding a reception chamber which has a housing opening defining a radially inward facing slot laterally flanked by the two housing legs and in which an annular sealing element designed for acting together with an inner surface of the seal housing to form a static seal and for acting together with an outer circumferential surface of the valve spool to form a dynamic seal is coaxially arranged, the sealing element having, for dynamic sealing, a dynamic sealing section located in a region of housing opening and coaxially enclosing the valve spool with sealing contact in at least one of the working positions, wherein a sealing groove is formed in a radially inward-oriented inner circumferential surface of the base section in an interior of the reception chamber of the seal housing between said joining regions, said sealing groove being radially open towards the inside and being designed as an annular groove having two axially opposite groove sides, wherein the sealing element dips into the sealing groove with a radially outward static sealing section which is designed for acting together axially with the two groove sides of the sealing groove arranged opposite one another in the base section for providing a static seal.

2. The valve according to claim 1, wherein the static sealing section of the annular sealing element has axially opposite side surfaces and at least one raised sealing region provided on each side surface, said sealing region comprising a sealing edge or a sealing bead and which can bear against the adjacent groove side of the sealing groove to form a static seal.

3. The valve according to claim 1, wherein each of said joining region is permeable to fluids.

4. The valve according to claim 1, wherein each of said joining region comprises an annular joining groove formed in an axial outer surface of the annular base section, each housing leg being installed in a respective one of the two annular joining grooves.

5. The valve according to claim 1, wherein the static sealing section has a smaller width than the sealing groove, the annular sealing element being axially movable in the seal housing, so that in operation the annular sealing element can be axially pressed by axially applied fluid pressure against a groove side of the sealing groove while forming a seal.

6. The valve according to claim 1, wherein the sealing element is provided with at least one axially protruding securing projection, which engages with an axial securing recess formed laterally on the inner surface of the seal housing, so that the sealing element is secured against radial extraction from the reception chamber of the seal housing.

7. The valve according to claim 6, wherein the sealing element is provided with two axially opposite side surfaces with a securing projection provided on each side surface, which engages with one of two opposite axial securing recesses on the inner surface of the seal housing.

8. The valve according to claim 6, wherein the at least one securing projection and the at least one securing recess are designed to be annular.

9. The valve according to claim 6, wherein the at least one securing projection is represented by the static sealing section, at least a section of the at least one securing recess being represented by the sealing groove.

10. The valve according to claim 6, wherein the at least one securing projection is located at a radial distance from the static sealing section and closer to the housing opening of the seal housing.

11. The valve according to claim 1, wherein several seal rings enclosing the valve spool are arranged at an axial distance from one another in the recess of the valve housing.

12. The valve according to claim 1, wherein at least the dynamic sealing section of the sealing element is capable of floating movement relative to the seal housing in a radial plane perpendicular to the central longitudinal axis of the recess.

13. The valve according to claim 1, wherein a free annular gap is formed between a radially outward-oriented outer circumferential surface of the sealing element and the radially inward-oriented inner circumferential surface of the seal housing.

14. The valve according to claim 1, wherein one of the two housing legs of the seal housing is designed as a guide leg, which has at least one radially inward-oriented guide surface, which, by direct contact with the outer circumferential surface of the valve spool and independent of the sealing element provides a transverse support and a linear guidance of the valve spool.

15. The valve according to claim 4, wherein the annular housing leg is located in the annular joining groove by plastically deformed retaining sections of the base section.

16. The valve according to claim 12, wherein the entire sealing element is capable of floating movement relative to the seal housing in a radial plane perpendicular to the longitudinal axis of the seal ring.

17. A valve comprising a valve housing and a piston valve spool arranged in a recess of the valve housing in an axially displaceable manner for performing linear switching movements between various working positions, the recess having a central longitudinal axis, and further comprising at least one seal ring, which coaxially encloses the valve spool in the recess, the seal ring comprising:

an annular seal housing located stationary relative to the valve housing and having a U-shaped cross-section bounding a reception chamber, the reception chamber defining a radially inward facing housing opening; and an annular sealing element received within said housing opening coaxially with said annular seal housing, said annular sealing element acting together with an outer circumferential surface of the valve spool to form a dynamic seal, the sealing element having, for dynamic sealing, a dynamic sealing section located in a region of the housing opening and coaxially enclosing the valve spool with sealing contact in at least one of the working positions of the valve spool, wherein the annular seal housing comprises two opposite housing legs connected to a radially outward annular base section, the housing legs and the base section being separate parts flanking the reception chamber, and wherein the base section comprises two joining regions and a sealing groove formed in a radially inward-oriented inner circumferential surface of the base section between the two joining regions, each joining region receiving a respective housing leg, and the sealing groove having opposite groove sides engaged by a static sealing section of the sealing element to form a static seal.

* * * * *